United States Patent [19]
Okura et al.

[11] Patent Number: 5,297,139
[45] Date of Patent: Mar. 22, 1994

[54] DATA COMMUNICATION SYSTEM

[75] Inventors: Yoshinori Okura, Mito; Shunji Inada, Hitachi; Norihiko Sugimoto, Katsuta; Masakazu Okada, Katsuta, all of Japan

[73] Assignee: Hitachi, Ltd., Tokyo, Japan

[21] Appl. No.: 901,131

[22] Filed: Jun. 19, 1992

[30] Foreign Application Priority Data

Jun. 19, 1991 [JP] Japan .................. 3-147094

[51] Int. Cl.⁵ ..................... H04J 3/14; H04L 12/26
[52] U.S. Cl. ..................... 370/60; 370/60.1;
370/61; 370/94.1; 370/94.2; 370/79; 370/77;
370/85.15
[58] Field of Search ............. 375/118; 370/94.1, 94.2,
370/60, 60.1, 85.15, 61, 84, 105.3, 108, 58.1,
58.2, 58.3, 77, 79, 84, 85.1, 85.2, 85.3, 85.4, 85.5,
13, 17

[56] References Cited

U.S. PATENT DOCUMENTS

| | | | |
|---|---|---|---|
| 4,175,287 | 11/1979 | Furhman | 375/118 |
| 4,692,894 | 9/1987 | Bemis | 370/84 |
| 4,841,550 | 6/1989 | George et al. | 375/118 |
| 4,922,438 | 5/1990 | Ballweg | 370/94.1 |

*Primary Examiner*—Wellington Chin
*Attorney, Agent, or Firm*—Antonelli, Terry, Stout & Kraus

[57] ABSTRACT

In a method of controlling a buffer device, data are received from a communication transmission line, and the received data are written in a buffer device at a predetermined write rate. The data written from the buffer device are started to be read at a predetermined read rate. The quantity of data written and accumulated in the buffer device is compared with a predetermined threshold for a predetermined period from the read start point of time. When it is found as the result of comparison that the quantity of accumulated data is the same as or less than the threshold, the buffer device performs only write of data from the communication transmission line and, when the quantity of accumulated data is larger than the threshold, the buffer device performs both write of data from the communication transmission line and read of data out of the buffer device at the same time during a predetermined period.

10 Claims, 17 Drawing Sheets

F I G. I

F I G. 2
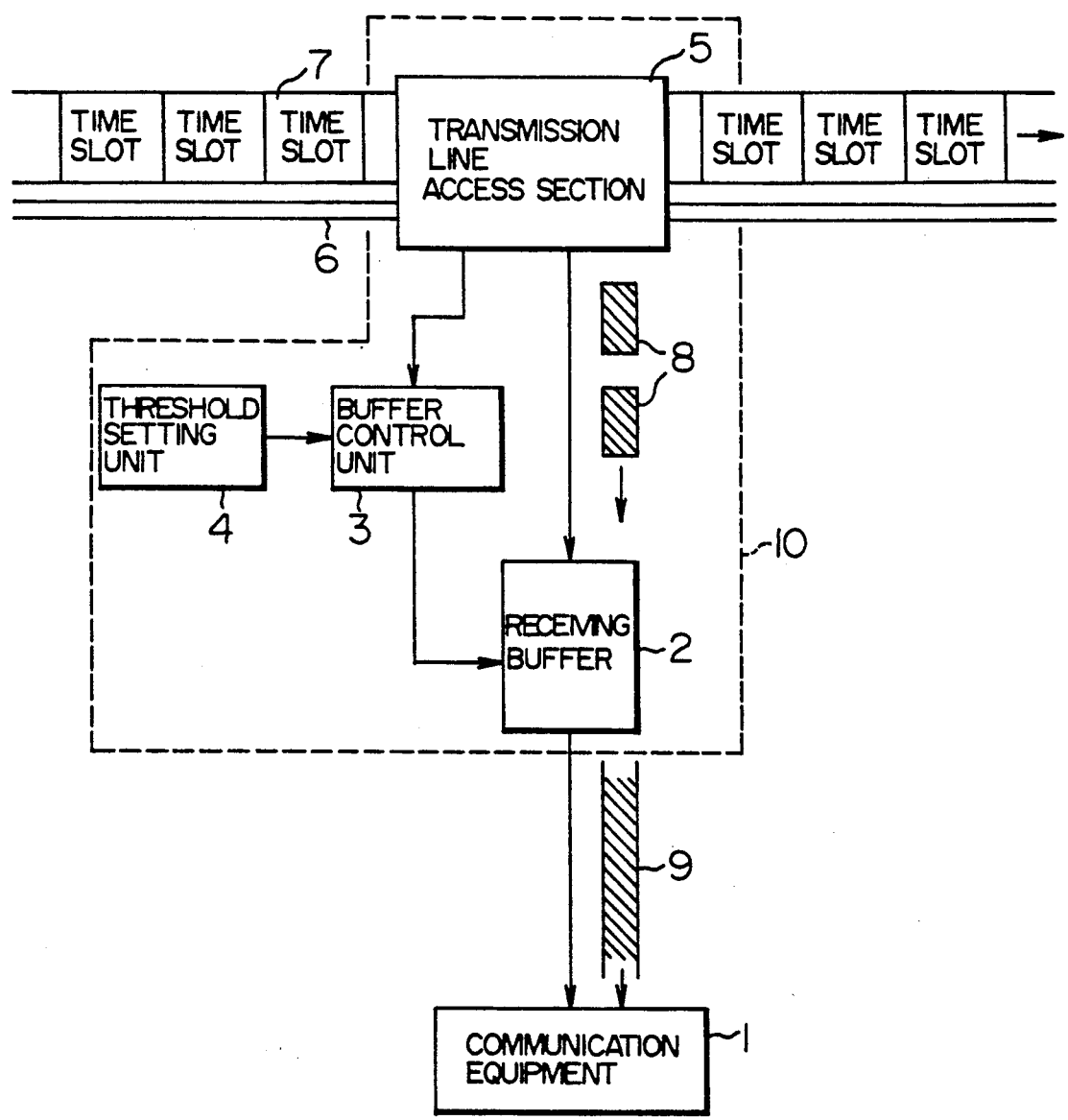

$$\begin{pmatrix} 1 \text{ SLOT PERIOD} : \tau = \alpha/X \\ a_1 = -Y\tau, \quad a_2 = -2Y\tau \\ b_1 = (X-Y)\tau, \quad b_2 = 2(X-Y)\tau \end{pmatrix}$$

▨ RESERVED TIME SLOT
☐ NON-RESERVED TIME SLOT

▨ RESERVED PACKET
☐ NON-RESERVED PACKET

DATA COMMUNICATION SYSTEM

BACKGROUND OF THE INVENTION

The present invention relates to a communication system in which a plurality of nodes are connected onto a multiplex transmission line of communication data having a frame structure formed by a plurality of time slots and a plurality of packets, and more particularly to a communication system suitable for receiving communication data while converting these data into continuous data.

As to communication data flowing in a communication transmission line, data are arranged in reserved time slots. A communication terminal equipment is connected to every node. A buffer is provided in each node, and the buffer takes in data from the transmission line at a predetermined write rate every time the reserved time slot arrives so as to store the data in a memory once. Then, the data are read continuously from the memory at a read rate slower than the write rate and sent to the communication terminal equipment.

The data from the transmission line stay in the buffer once before they are sent to the communication terminal equipment. This residence time becomes the delay time of data transmission among communication terminal equipment. The shorter the residence time is, the shorter the data transmission time becomes, which is preferable.

It is referred to as underflow that there is no accumulated data in the memory of the buffer and a state of being unable to read data out of the memory is continuous. Conventionally, when underflow is generated, it has been waited to read out the data until data are accumulated sufficiently in a memory of a buffer. The queuing time has become the residence time of the data, thus making the time required for data transmission to the communication terminal longer.

A control method of a buffer in case underflow is generated is disclosed in Japanese patent un-examined publication No. JP-A-64-41541 filed by FUJITSU LTD. on Aug. 8, 1987. In this buffer control system, a counter for counting every time underflow is generated in a receiving buffer is provided, and data are read out of the receiving buffer after storing count values worth of data quantity are stored once in the receiving buffer.

In the techniques disclosed in this official gazette, there has been such a problem that the residence time of data in the buffer is required by the count value portion of the buffer number set in the counter, and the transmission delay time becomes longer in accordance therewith.

A method of circuit switching in a token ring Local Area Network (LAN) is disclosed in Japanese patent un-examined publication No. JP-A-62-266943 filed by Mitsubishi Electric Corp. on May 14, 1986. According to the invention set forth in this official gazette, data are transferred after accumulating the data in a buffer for a certain period of time, and a problem of transmission delay due to the residence time of data is posed.

A multichannel packet receiving system is disclosed in Japanese patent un-examined publication No. JP-A-62-266946 filed by FUJITSU LTD. on May 14, 1986. According to the invention set forth in this official gazette, dummy data are accumulated in a buffer in advance, and the quantity of those dummy data (offset) is varied in accordance with communication distance in order to absorb arrival fluctuation of the data.

A present communication system is disclosed in Japanese patent un-examined publication No. JP-A-2-14644 filed by NEC Corp. on Jun. 30, 1988. According to the invention set forth in this official gazette, flow control among nodes in units of packet is performed.

A buffer memory circuit for packet transmission is disclosed in Japanese patent un-examined publication No. JP-A-2-111137 filed by FUJITSU LTD. on Oct. 20, 1988. According to the invention set forth in this official gazette, read and write addresses are moved, respectively, when overflow and underflow are generated.

A load control system of a packet exchange is disclosed in Japanese patent un-examined publication No. JP-A-2-1671 filed by TOSHIBA CORP. on Jun. 30, 1988. According to the invention set forth in this official gazette, when the data quantity in a buffer exceeds a certain threshold, conflict is made to generate intentionally on a bus so as to delay data transmission to the buffer temporarily.

SUMMARY OF THE INVENTION

It is an object of the present invention to provide a communication system having little transmission delay and a control method thereof.

In order to achieve such an object, according to a control method of a buffer of the present invention, data are received from a communication transmission line, received data are written in a buffer at a predetermined write rate, the data written from the buffer are started to be read at a predetermined read rate, and, during a predetermined period from the read start point of time, the quantity of data written and accumulated in the buffer is compared with a predetermined threshold, and the buffer only writes data from the communication transmission line when it is found as the result of comparison that the quantity of accumulated data is the same as or less than the threshold, and the buffer both writes data from the communication transmission line and reads data out of the buffer at the same time when the quantity of accumulated data is larger than the threshold for a predetermined period.

Further, the buffer of the communication system according to the present invention includes a unit for receiving data from the communication transmission line, a memory device for storing received data, a unit for controlling the timing to write received data in the memory device at a predetermined write rate, a threshold setting unit for designating the minimum quantity of data accumulated in the memory device and a unit for comparing the quantity of data written and accumulated in the memory device with the threshold for a predetermined period from the read start point of time, and prohibiting read of data from the memory device when the quantity of accumulated data is the same as or less than the threshold and permitting read of data out of the memory device at a predetermined read rate when the quantity of data accumulated in the memory device is larger than the threshold.

Furthermore, the communication system according to the present invention includes a communication transmission line in which communication data are transmitted and a plurality of communication nodes coupled with the communication transmission line, and each of communication nodes further includes a unit for receiving data from the communication transmission line, a communication terminal equipment coupled with the communication node, a buffer arranged between the communication receiving unit and the communication terminal equipment and controlling transmission of communication data, a memory device for storing received data, a unit for controlling the timing to write received data in the memory unit at a predetermined write rate, a threshold setting unit for designating the minimum quantity of data accumulated in the memory unit, and a unit for comparing the quantity of data written and accumulated in the memory unit with the threshold for a predetermined period from the read start point of time, and prohibiting read of data out of the memory device when the quantity of accumulated data is the same as or less than the threshold and permitting read of data out of the memory device at a predetermined read rate when the quantity of data accumulated in the memory device is larger than the threshold.

According to the present invention, the residence time of data in the buffer is made as shortest as possible by adjusting the data accumulation quantity to the minimum quantity to such an extent that the receiving buffer does not generate underflow after one frame period portion of data are accumulated in the receiving buffer in advance without reading those data as continuous data. As a method of adjusting the data accumulation quantity, the minimum value of the data accumulation quantity in the receiving buffer which varies timewise is set as a target value by performing buffer control only in a certain period after communication is started.

BRIEF DESCRIPTION OF THE DRAWINGS

FIG. 2 is a block diagram of a receiving node of a communication system;

DESCRIPTION OF THE PREFERRED EMBODIMENTS

Figure 1:
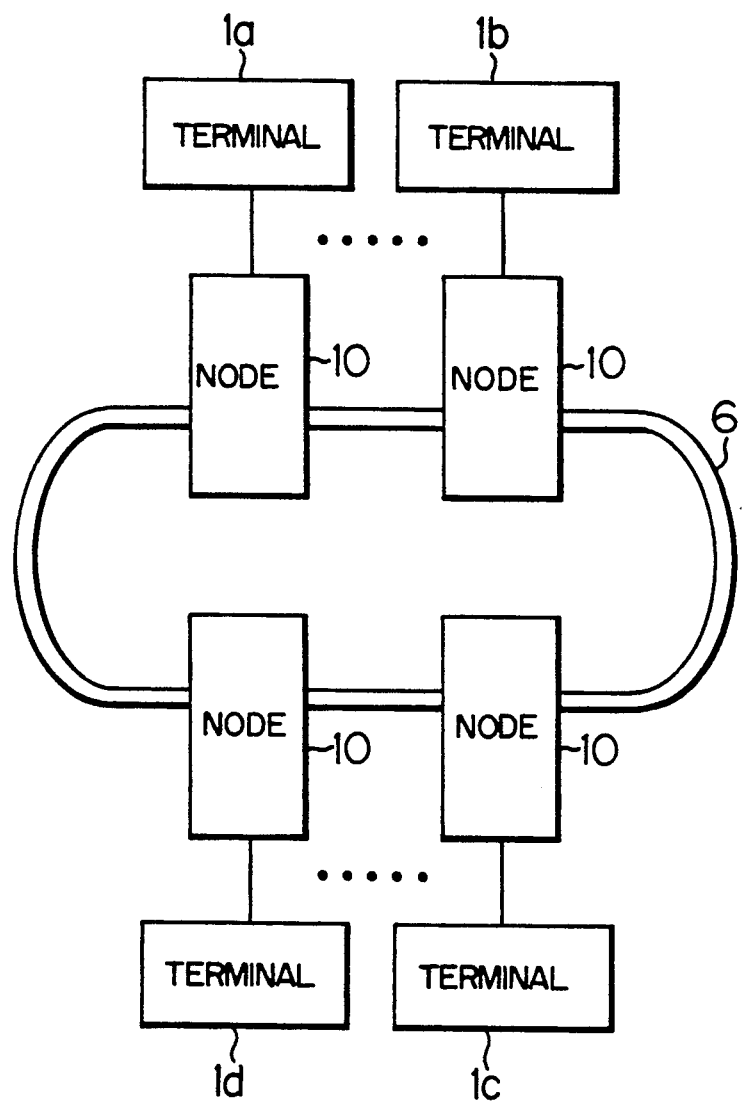
FIG. 1 is a structural diagram of a communication system with the present invention.

Embodiments of the present invention will be described hereinafter with reference to the drawings. FIG. 1 shows a general structure of a communication system representing an embodiment of the present invention. In FIG. 1, a plurality of nodes (stations) 10 are connected to a transmission line 6. Communication terminals 1a to 1d are connected to the plurality of nodes, respectively so as to form a communication system, and transmission and reception of data are performed among communication terminals.

Although only four communication terminals are connected to the transmission line 6 in the communication system shown in FIG. 1 for the sake of simplicity, but the present invention can cope with any plurality number of terminals.

Next, FIG. 2 shows a block diagram of an internal structure of the node 10. In respective nodes on the multiplex transmission line 6 each having a frame structure composed of a plurality of time slots 7, a transmission line access section 5 takes packet-formed data 8 out of reserved time slots and writes them in a receiving buffer 2. A threshold for compensating variation of data accumulation quantity in the receiving buffer 2 due to clock variation of a clock for data transmission and a clock for buffer driving is set in advance in a threshold setting unit 4. Further, when it is assumed that a point of time when packet-formed data 8 are started to be accumulated in the receiving buffer 2 is adopted as a communication start point of time, and that a point of time when a certain period of time has elapsed from the point of time when data are started to be read to a communication equipment 1 from the receiving buffer 2 is adopted as the initialization termination point of time, a buffer control unit 3 performs receiving buffer control as described hereunder only in a period from the communication start point of time to the initialization termination point of time.

Figure 3:
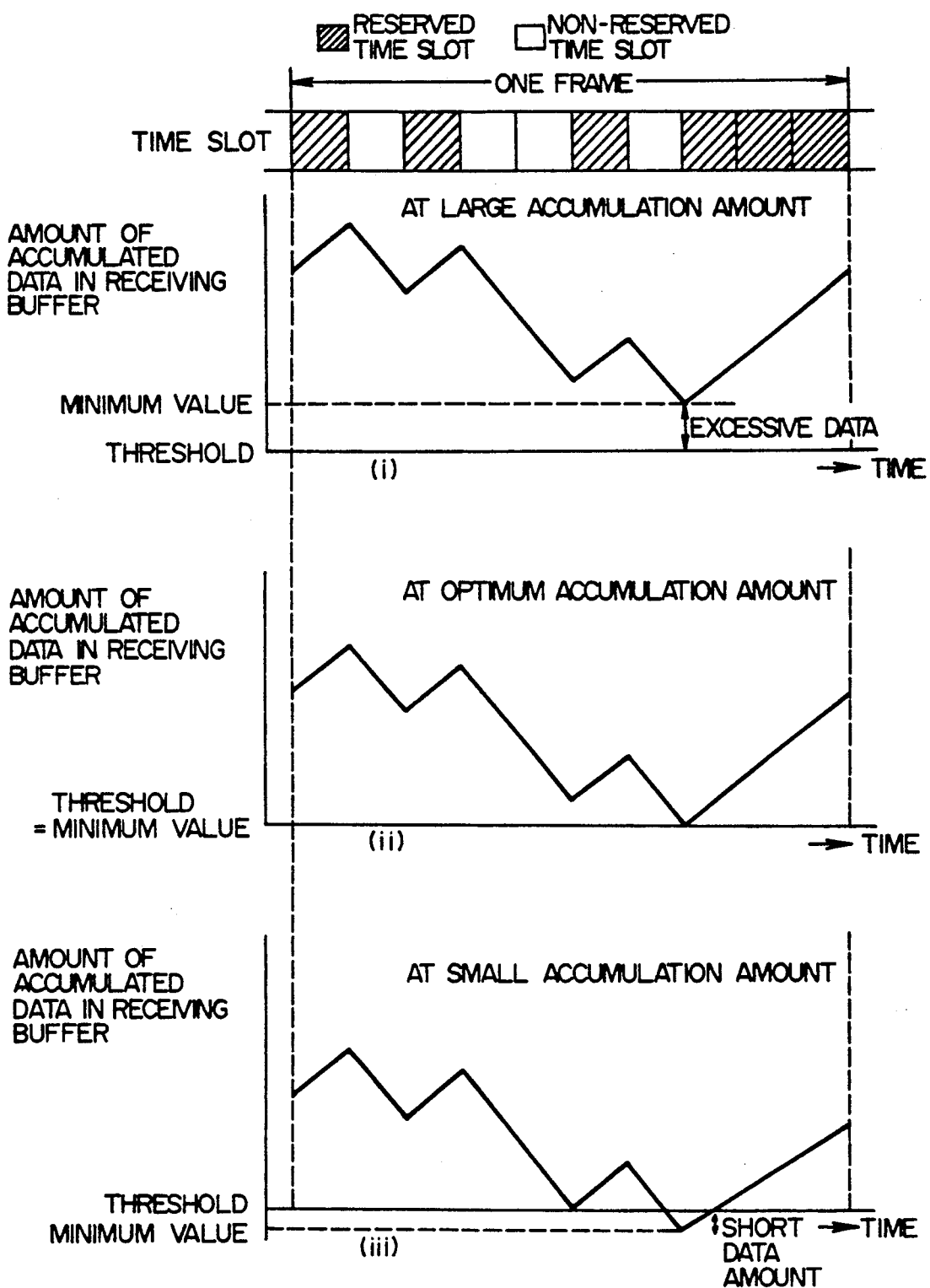
FIG. 3 is a diagram showing timewise variation of the data accumulation quantity in a receiving buffer.
Figure 4:
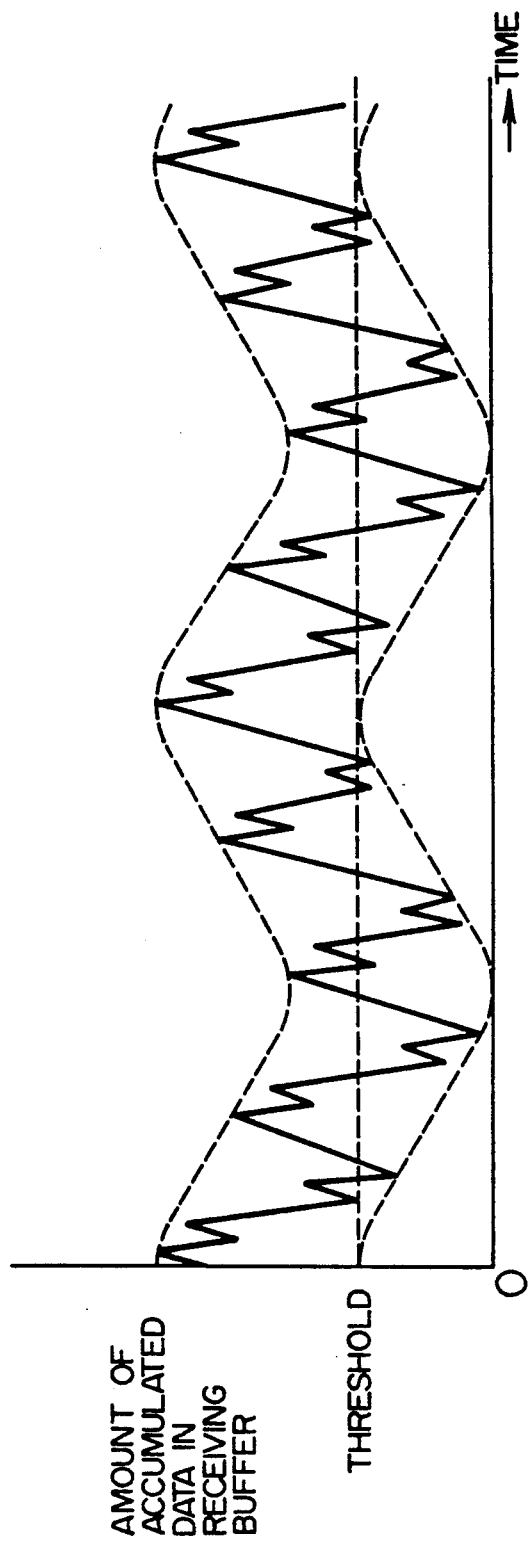
FIG. 4 is a diagram showing variation of the data accumulation quantity when clock variation is produced.

As shown in FIG. 3, when time slots in the frame are reserved, a variation pattern of the data accumulation quantity in the receiving buffer 2 is determined in one way corresponding thereto. This variation pattern is repeated for every frame, but a point of time when the data accumulation quantity becomes the minimum always exists within are frame period. When the minimum value of the data accumulation quantity is set as shown at (ii) among (i), (ii) and (iii) shown in FIG. 3, buffer underflow does not occur, thus enabling it to minimize the buffer residence time of the data. On the other hand, clock variation such as jitter is produced in many cases in the clock for data transmission and the clock for buffer driving used for write and read of the buffer in a practical communication system. When such clock variation is produced, the speed of writing and reading data in and from the receiving buffer is varied, and the data accumulation quantity also varies in accordance therewith. At this time, there is a possibility that buffer underflow occurs when the clock variation is produced if the minimum value of the data accumulation quantity is set at zero. Thus, when taking clock variation into consideration, a data quantity which is able to compensate such a variation is set at a data quantity in which the minimum quantity of the data accumulation quantity is set is adopted, it is possible to minimize the buffer residence time of the data after compensating the clock variation. FIG. 4 shows a variation example of the data accumulation quantity in the receiving buffer 2 in case clock variation is produced. However, above-mentioned minimum value of the data accumulation quantity may be zero in case the clock variation needs not to be considered.

Control procedures of the receiving buffer 2 will be described further.

Figure 5:
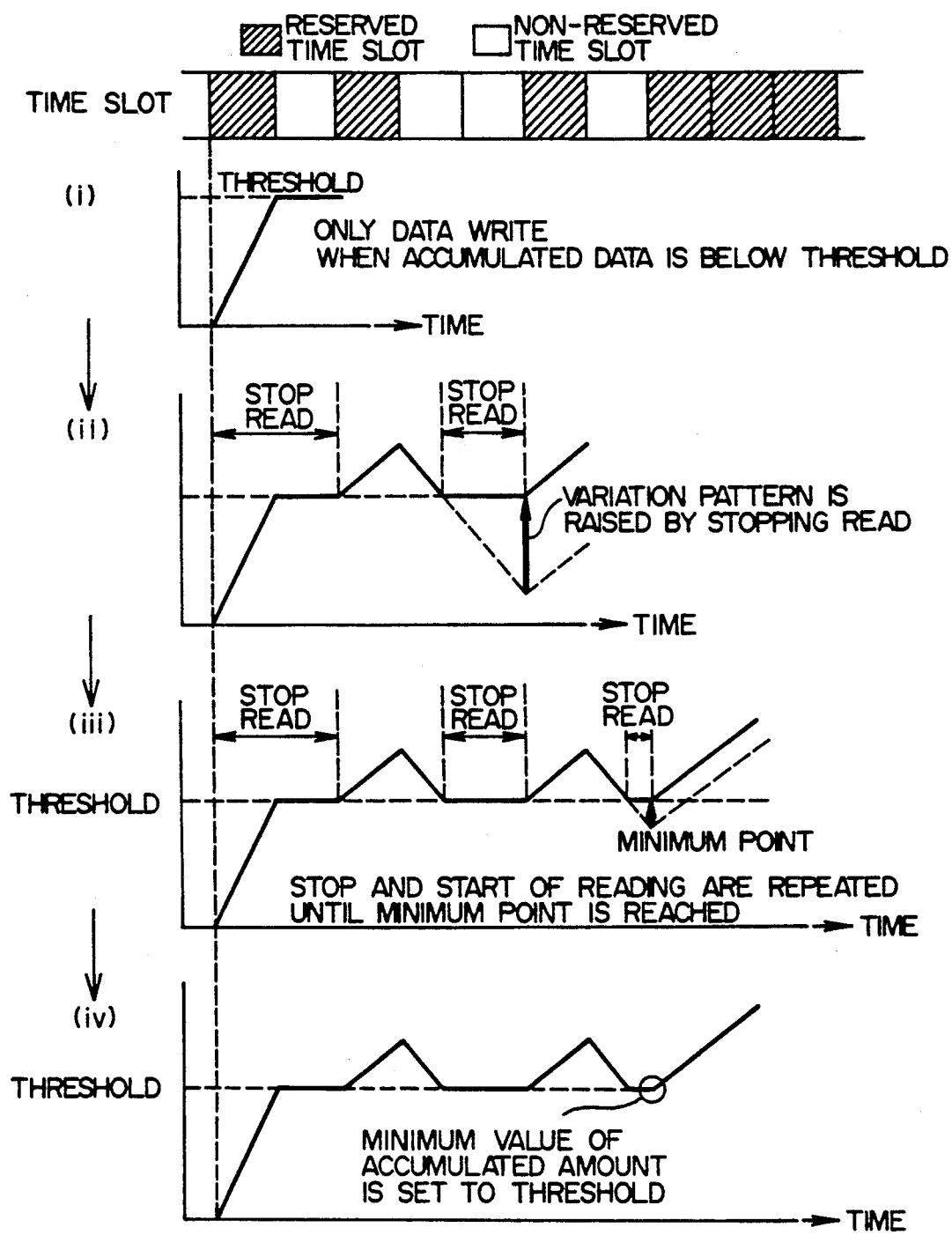
FIG. 5 is a diagram for explaining a control method of a receiving buffer in an embodiment according to the present invention.
Figure 6:
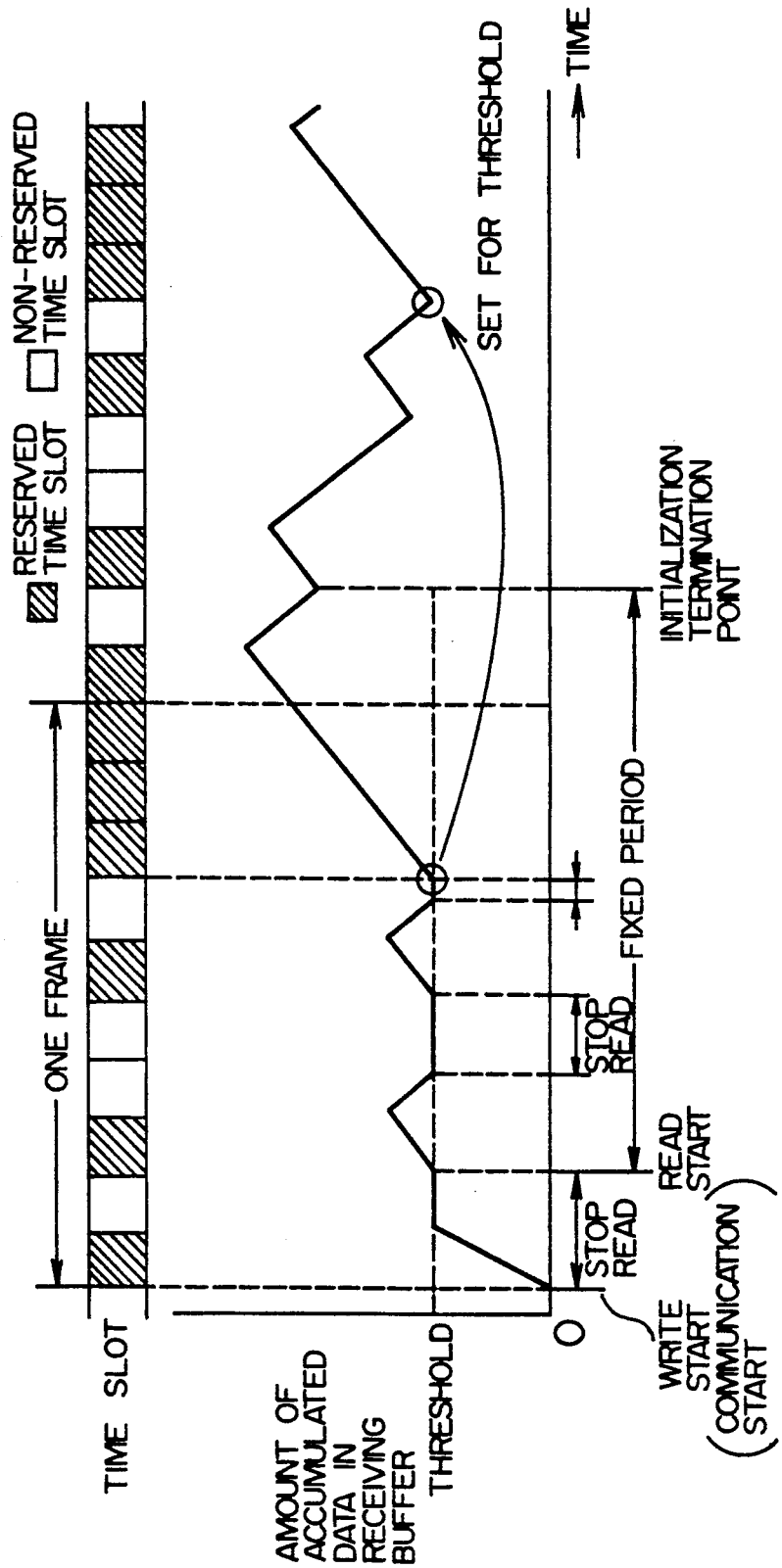
FIG. 6 is a diagram for explaining a control method of a receiving buffer in an embodiment according to the present invention.

First, only write of packet-formed data 8 into the receiving buffer 2 is performed (FIG. 5(i)). From the time when the accumulated data quantity in the receiving buffer 2 becomes equal to the threshold to the time of termination of initialization, continuous data 9 are read out of the receiving buffer 2 in parallel with write of the packet-formed data 8 when the accumulated data quantity in the receiving buffer 2 becomes larger than the threshold, and read of continuous data 9 out of the receiving buffer 2 is stopped and only write of packet-formed data 8 is performed when the accumulated data quantity of the receiving buffer 2 becomes the same as or less than the threshold (FIGS. 5 (ii), (iii)). At and after the initialization termination point of time, continuous data 9 are read out of the receiving buffer 2 and packet-formed data 8 are written in parallel therewith irrespective of the data accumulation quantity in the receiving buffer 2 (FIG. 5(iv)). By means of such buffer control, it is possible to set the minimum value of the data accumulation quantity in the receiving buffer 2 at the threshold.

Figure 7:
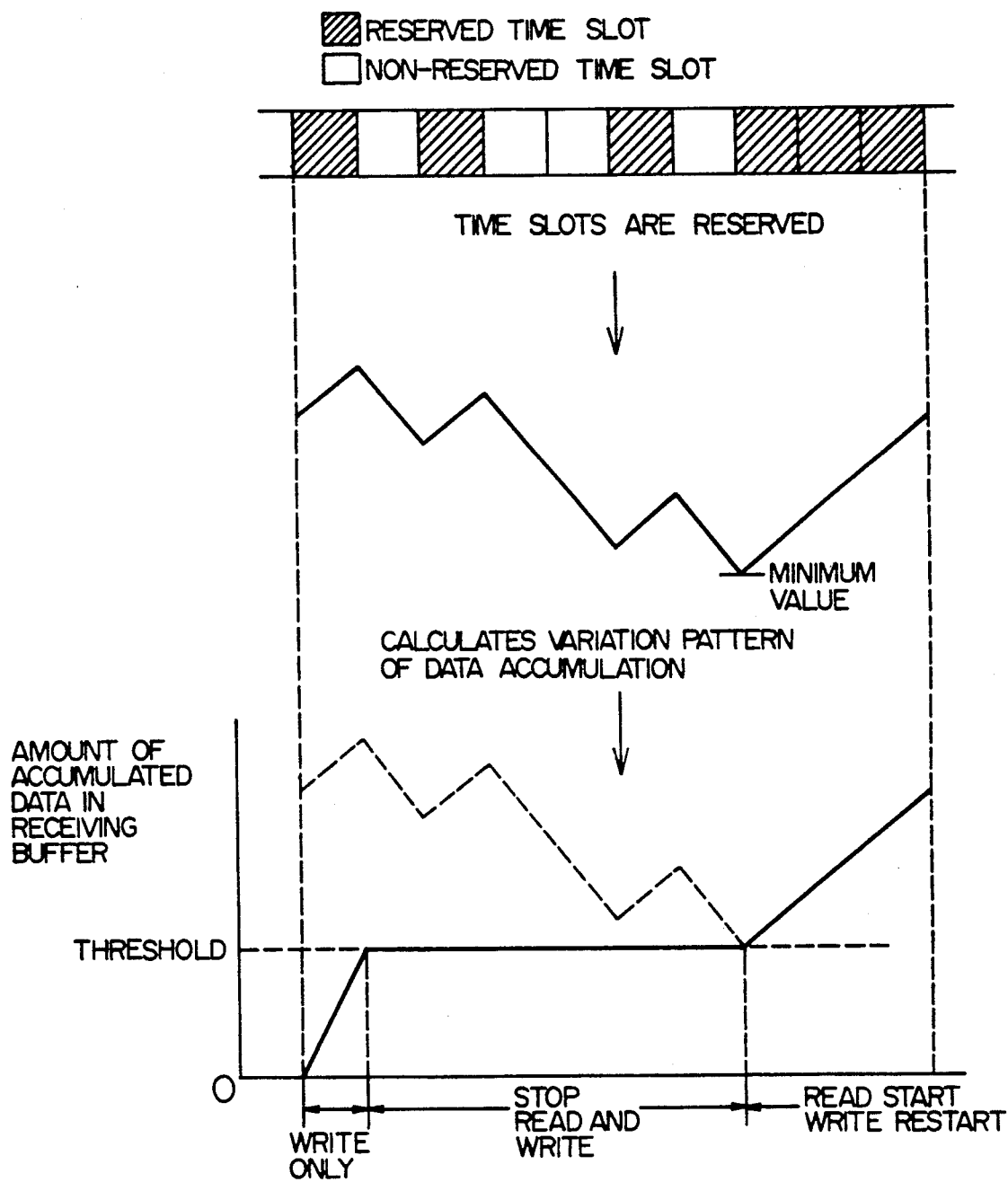
FIG. 7 is a diagram for explaining a control method of a receiving buffer in an embodiment according to the present invention.

Further, in case there is such means that the node on the receiving side recognizes the position of the reserved time slot before starting communication, the buffer control unit 3 computes the minimum point of time when the data accumulation quantity in the receiving buffer 2 becomes the minimum from the position of the reserved time slot, and controls write and read of the receiving buffer 2 based on the result of computation. Furthermore, such a method of control that the initialization termination point of time is adopted as the first minimum point of time after the point of time when data are started to be read to a communication equipment, data are not read, but data are only written until the data accumulation quantity becomes equal to the threshold after accumulation of data in the receiving buffer 2 is started, neither data write nor data read is performed from the point of time when the data accumulation quantity becomes equal to the threshold until the initialization termination point of time, and data are written and data are read in parallel with each other irrespective of the data accumulation quantity in the receiving buffer 2 after the initialization termination point of time (FIG. 7) may be applied.

Figure 8:
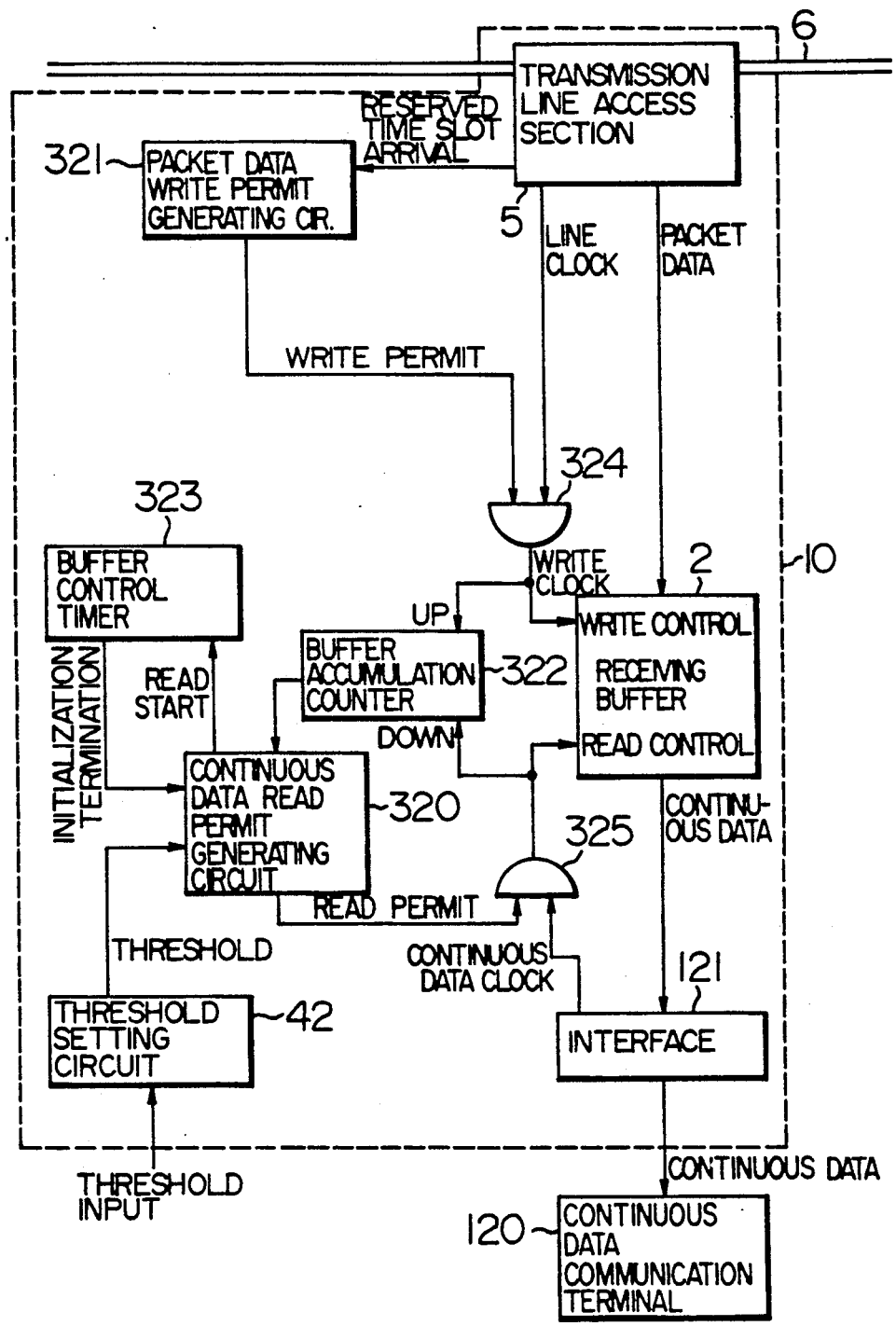
FIG. 8 is a block diagram showing an internal structure of a receiving node in an embodiment according to the present invention.
Figure 9:
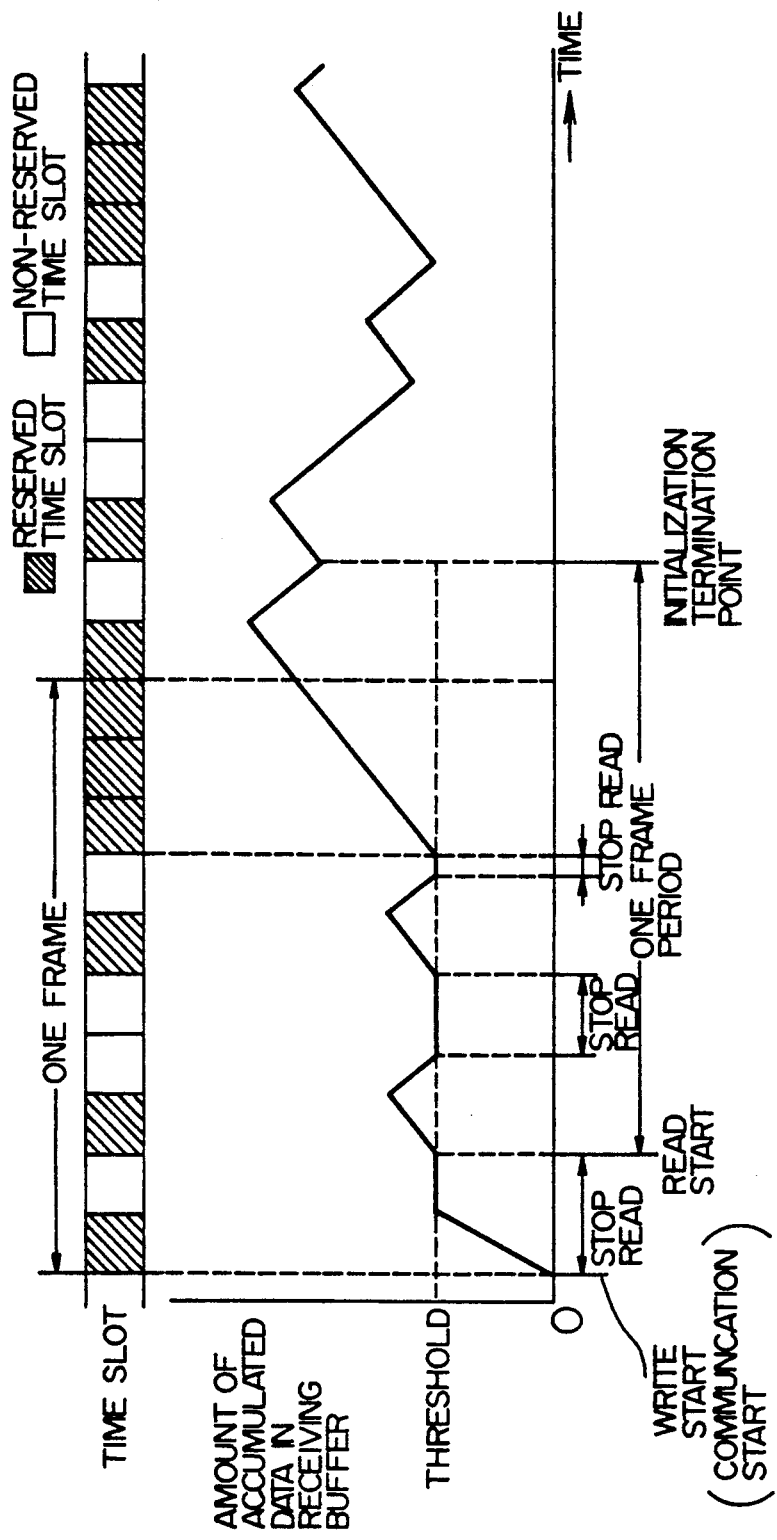
FIG. 9 is a diagram showing the relationship between reserved time slots and the data accumulation quantity of the receiving buffer in an embodiment according to the present invention.

A more detailed structure of the node 10 connected to the transmission line 6 will be described with reference to FIG. 8. Besides, a receiving section of the node 10 will be described in particular in the present embodiment, and description of a sending section will be omitted.

A transmission line access section 5 which has taken out packet-formed data out of reserved time slots on the multiplex transmission line 6 sends arrival notice of reserved time slots to a packet-formed data write permit generating circuit 321. Based on the above, the packet-formed data write permit generating circuit 321 sends above-mentioned write permit notice to an AND circuit 324, and the AND circuit 324 produces a logical product of the above-mentioned write permit notice and the transmission line clock from the transmission line access section 5 and sends it to the receiving buffer as a write clock. Packet-formed data are written in the receiving buffer 2 using the write clock. Further, the write clock is also sent to a buffer accumulation quantity counter 322 and adds a counter value by 1 at a time. The buffer accumulation quantity counter 322 always informs a continuous data read permit generating circuit 320 of the data accumulation quantity which is a counter value.

On the other hand, a threshold for compensating variation of the data accumulation quantity of the receiving buffer 2 due to variation of a data transmitting clock and a buffer driving clock is set in a threshold setting circuit 42 in advance.

The threshold setting circuit 42 informs the continuous data read permit generating circuit 320 of the set threshold. The continuous data read permit generating circuit 320 starts such control that the read permit is not informed to an AND circuit 325 when the data accumulation quantity informed from the buffer accumulation counter 322 is at the threshold or below, but the read permit is informed to the AND circuit 325 when above-mentioned data accumulation quantity is larger than above-mentioned threshold at the communication start point of time (the point of time when 1 is added in the first place to the state that the data accumulation quantity is zero, i.e., the write start point of time of the packet-formed data into the receiving buffer 2.

The read permit notice sent from the continuous data read permit generating circuit 320 produces a logical product with the continuous data clock from the interface 121 in the AND circuit 325, and the logical product is sent to the receiving buffer 2 as a read clock. Further, the read clock is also sent to the buffer accumulation quantity counter 322 and subtracts the counter value by 1 at a time.

The continuous data read permit generating circuit 320 sends a read start notice to a buffer control timer 323 when above-mentioned data accumulation quantity becomes larger than above-mentioned threshold in the first place counting from the communication start point of time (read start point of time of the continuous data from the receiving buffer 2. The buffer control timer 323 starts to time from this point of time and sends an initialization termination point of time notice to the continuous data read permit generating circuit 320 at a point of time when the time corresponding to one period portion of the frame on the transmission line has elapsed. The continuous data read permit generating circuit 320 which has received the initialization termination point of time notice completes above-mentioned control at this point of time, and continuous to send the read permit notice to the AND circuit 325 irrespective of data accumulation quantity.

The continuous data which have been read out of the receiving buffer 2 are converted into a form of continuous data which can be accessed by a continuous data communication terminal 120 in the interface 121. The converted data are sent to the continuous data communication terminal 120.

Figure 10:
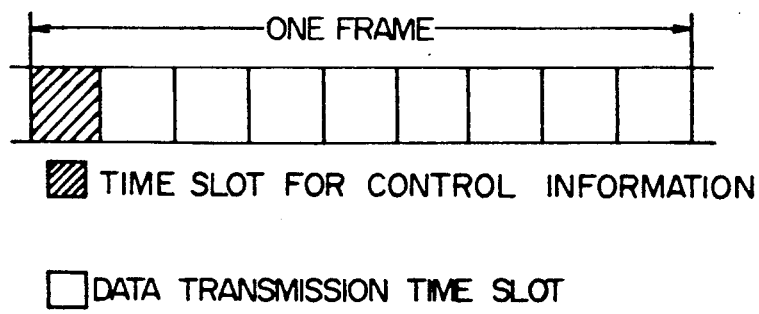
FIG. 10 shows an example of a frame provided with a control time slot.
Figure 11:
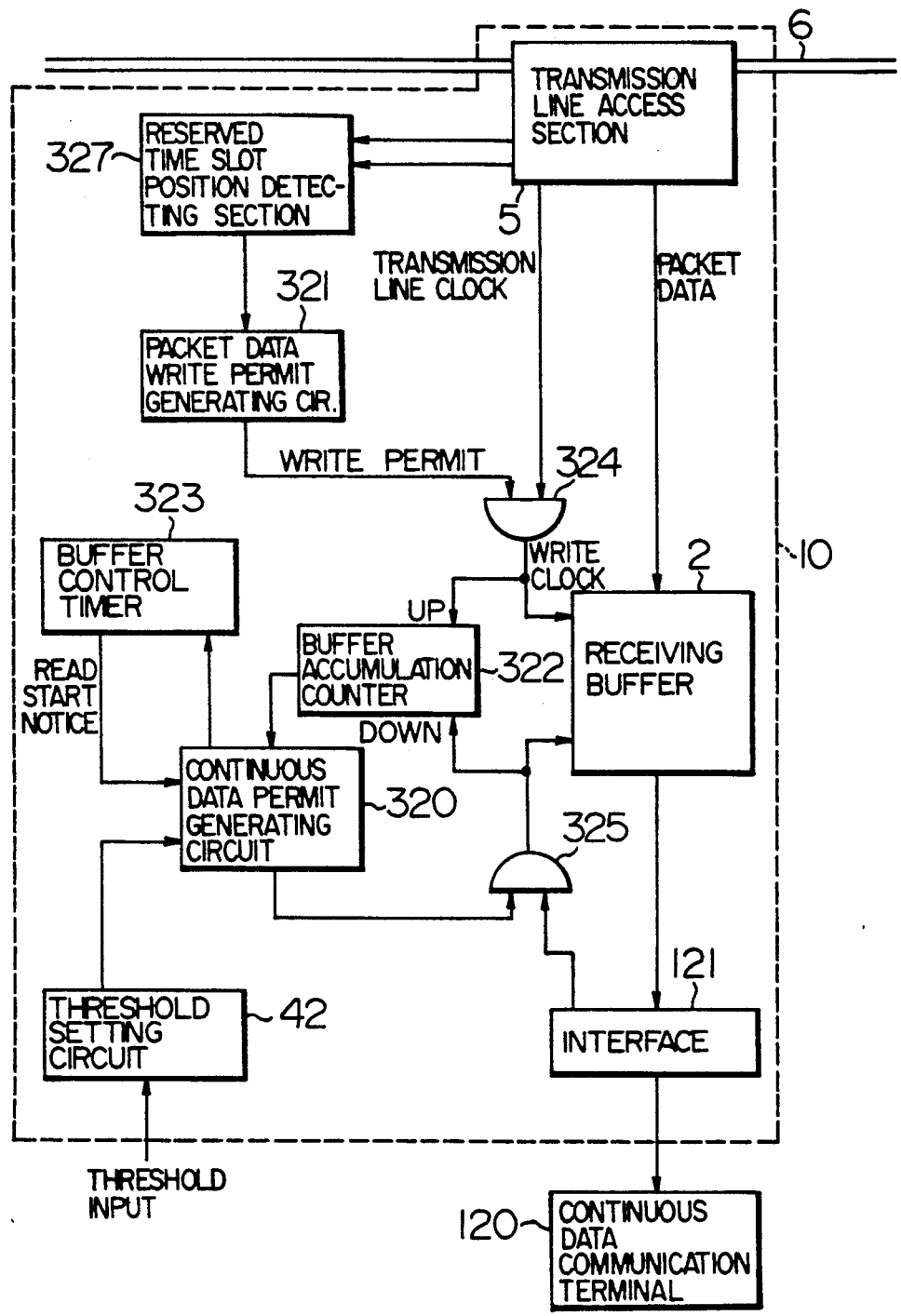
FIG. 11 is a block diagram showing an internal structure of a receiving nod in an embodiment according to the present invention.

Another embodiment of the present invention will be described in the next place. For example, when the communication data include a control time slot for informing of the position of the reversed time slot in the frame thereof as shown in FIG. 10, the node 10 is structured so that a reserved time slot detecting section 327 is added further to the structure shown in FIG. 8 as shown in FIG. 11. The reversed time slot detecting section 327 receives the control time slot at the head of the frame from the transmission access section 5, and holds the received positional information on the reserved time slot. The reserved time slot detecting section 327 counts up a counter (not shown) included inside thereof every time a time slot following the control time slot arrives. The reserved time slot detecting section 327 informs the packet-formed data write permit generating circuit 321 of the arrival of the reserved time slot every time the count value coincides with the point of time of the reserved time slot position. The processing is performed in a similar manner as the description on FIG. 8 thereafter.

Figure 12:
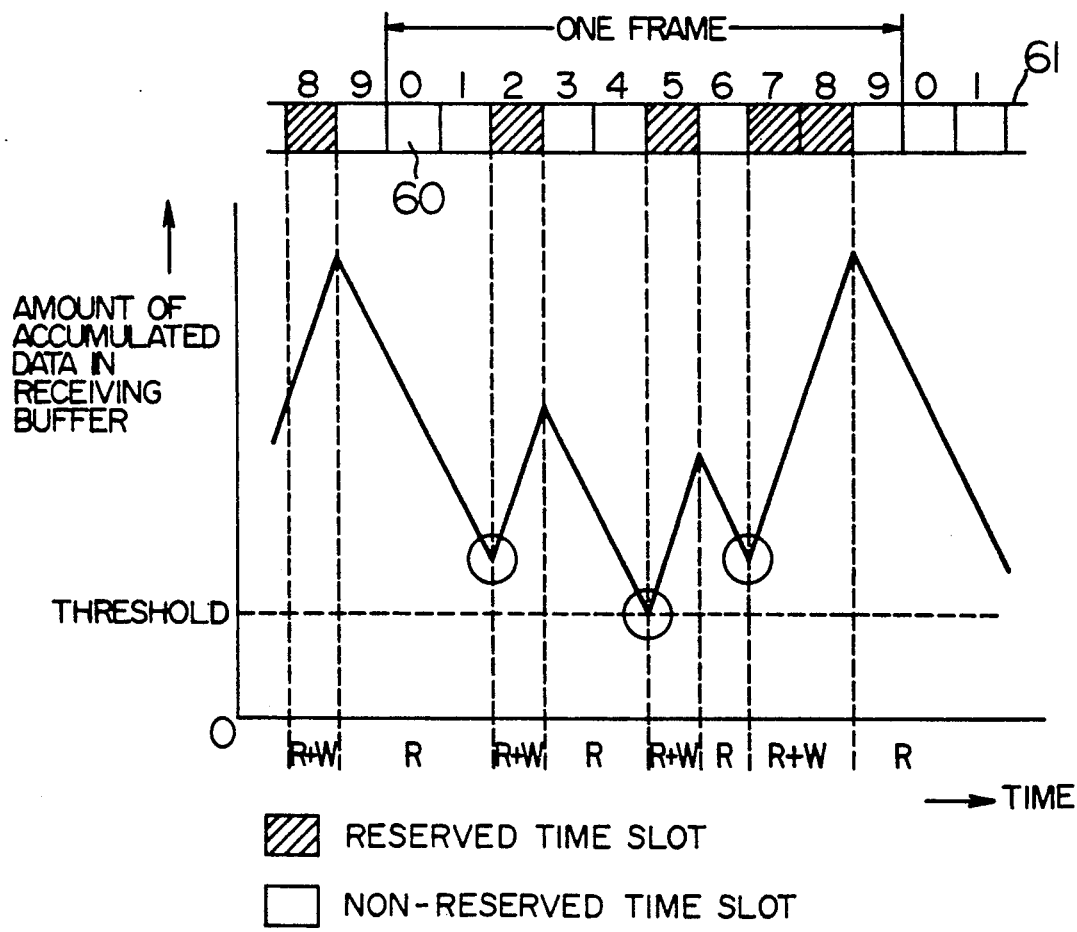
FIG. 12 is a diagram for explaining the operation of the embodiment shown in FIG. 11.

The operation of the embodiment shown in FIG. 11 will be described with reference to a more concrete example. FIG. 12 is a diagram showing an example of write operation of communication data 61 having control time slots 60 into the receiving buffer 2 and read operation out of the receiving buffer 2. Communication data 61 having a length slightly exceeding that of one frame are shown in the upper part of the diagram. The number shown above the communication data 61 indicate slot numbers. The axis of ordinates of the diagram represents the data accumulation quantity in the receiving buffer 2, and the axis of abscissas thereof represents the time elapsed. R +W shows that read and write are performed at the same time, and R shows that write is not performed, but read only is performed.

As it is understood from the diagram shown in FIG. 12, local minimum points (points surrounded with circles) of the data accumulation quantity appear at points of change from a read period R to a read-write simultaneous period R+W. The smallest value among a plurality of local minimum values is the minimum value, and underflow is not generated when this minimum value is set so as to coincide with the threshold. If there are a plurality of minimum values, the point of time of the minimum value which generates at the earliest time is the initialization termination point of time, the data accumulation quantity and the threshold are compared with each other. Such initialization control that the buffer only writes the data when it is found as the result of comparison that the accumulated data quantity is the same as or less than the threshold, and the buffer writes and reads the data at the same time when the accumulated data quantity is larger than the threshold.

At the point of time when the data accumulation quantity in the receiving buffer has reached to the minimum value and thereafter, the data accumulation quantity will never become less than the minimum value even if the data from the receiving buffer are read out and written at the same time. Accordingly, when it is assumed that the period until the minimum value is reached is the initialization control period, underflow is not generated at and after the minimum value even if the data are read and written at the same time. The point where this minimum value is generated is detected by utilizing reserved time slot positional information shown by the control time slot 60. An example of initialization setting will be described with reference to FIG. 13.

Figure 13:
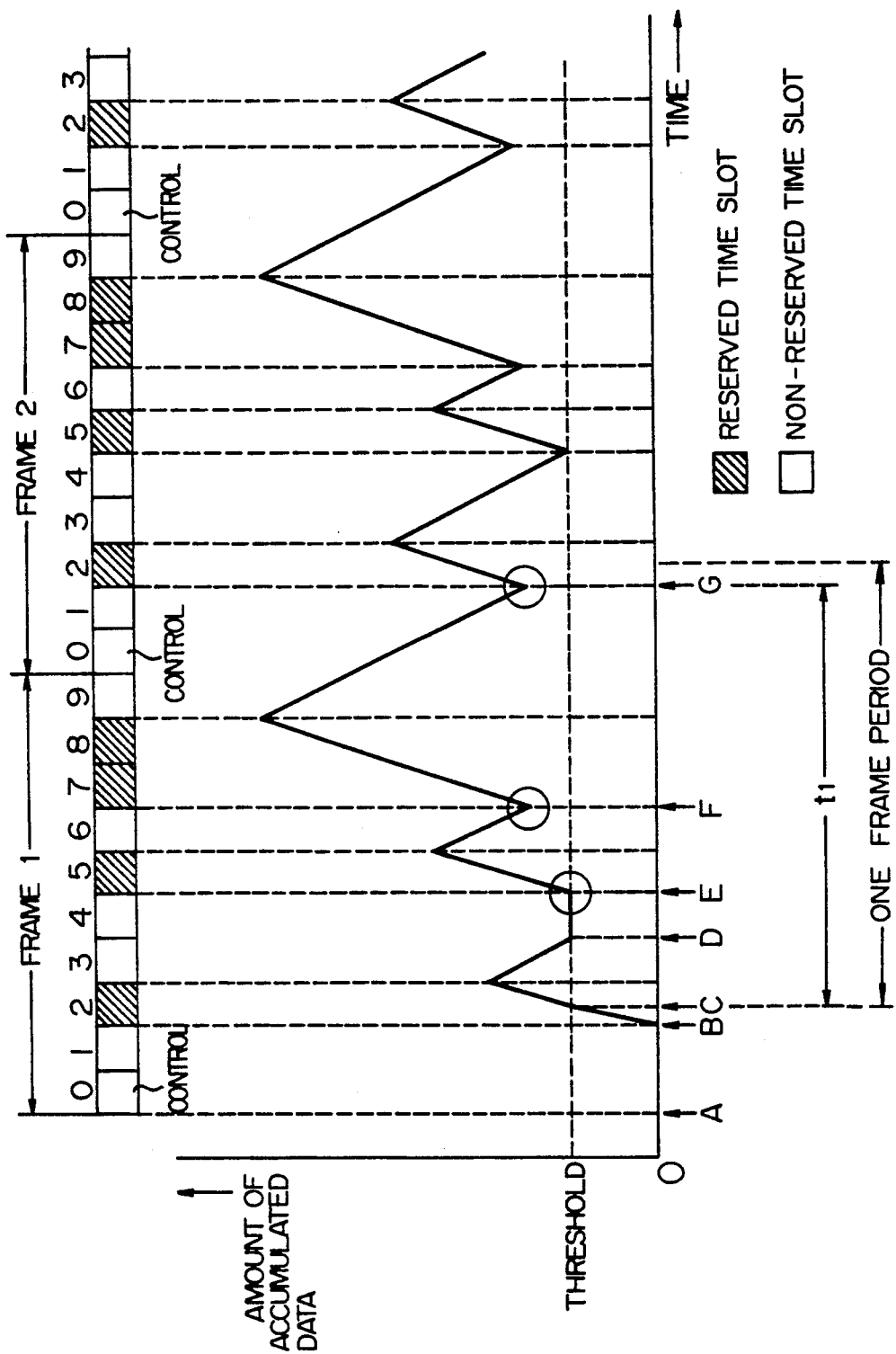
FIG. 13 is a diagram for explaining the operation of the embodiment shown in FIG. 11.

The reserved time slot position detecting section 327 detects positions of reserved time slots (slot numbers 2, 5, 7 and 8) of the frame 1 by reserved time slot positional information located in the control time slot having the slot number 0 of the first frame 1 of the received data. A local minimum point of data accumulation quantity is obtained within a period t1 corresponding to one frame from the first read start point of time B. In the case of FIG. 13, the minimum point is at E in the first frame and at G in the second frame. The last point G of the local minimum value among these local minimum values is determined as the initialization termination point of time. Thus, the initialization control is terminated when the initialization termination point of time G is reached after counting the time slots in the frame.

Figure 14:
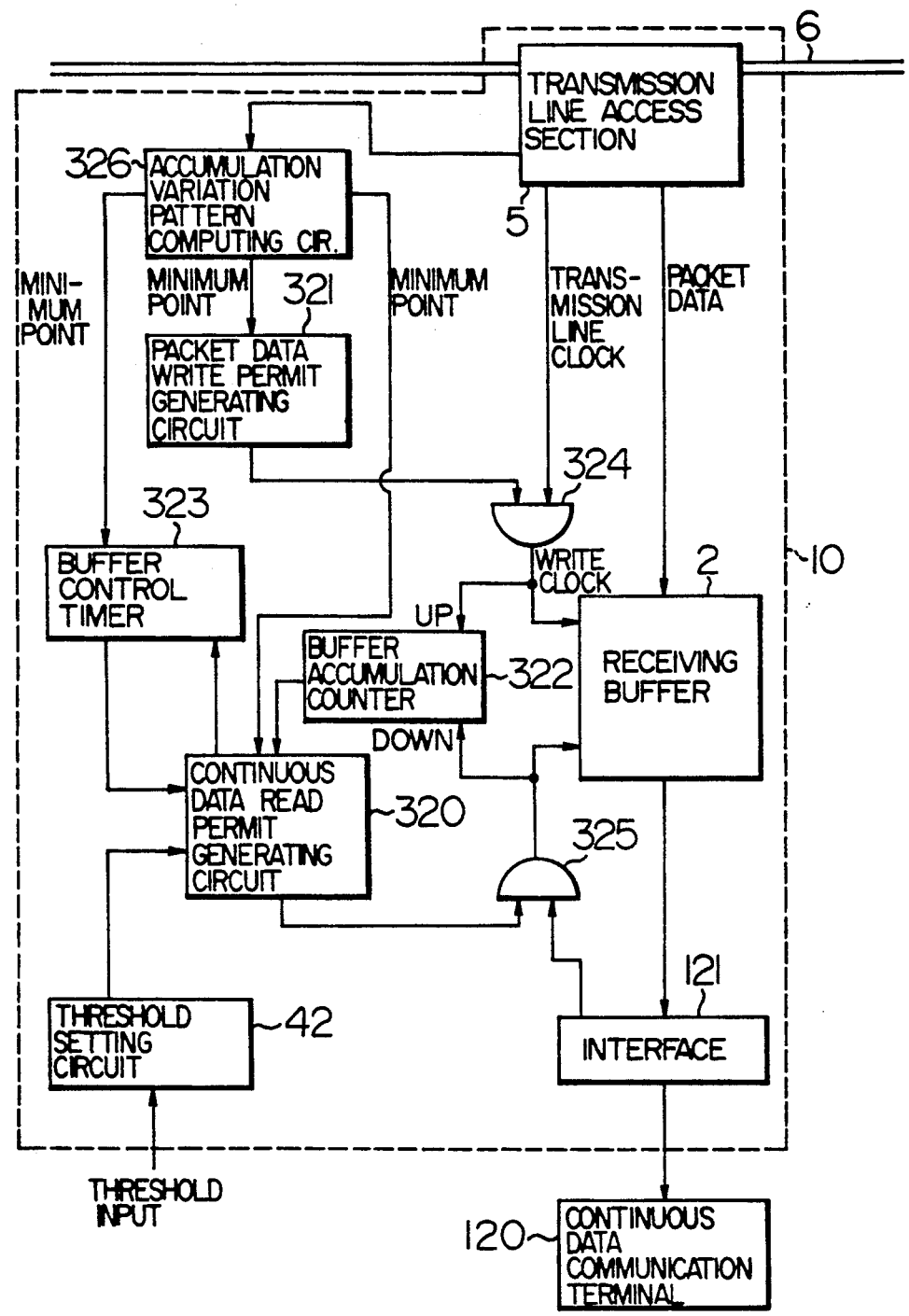
FIG. 14 is a block diagram showing an internal structure of a receiving nod in an embodiment according to the present invention.

A structure shown in FIG. 14 in which a data accumulation quantity variation pattern computing circuit 326 for obtaining through computation a point of time when the data accumulation quantity in the receiving buffer 2 shows the minimum is added to the structure shown in FIG. 8 will be described. The accumulation quantity variation pattern computing circuit 326 receives the reserved time slot position notice from the transmission line access section 5, computes the variation pattern of the data accumulation quantity in the receiving buffer 2, and informs the buffer control timer 323 of the minimum point of time when the data accumulation quantity becomes the minimum. The buffer control timer 323 determines the initialization termination point of time from the informed minimum point of time. An example of the computing method will be shown hereunder. When it is assumed that a ratio of a data transmission rate to a continuous data transmission rate in the multiplex transmission line is X:Y (X>Y), the data accumulation quantity in the receiving buffer 2 increases at a rate proportional to (X−Y) at time of receiving the reserved time slot, and the data accumulation quantity decreases at a rate proportional to Y at time of non-reserved time slot passage. Thus, increase or decrease of the accumulation quantity is expressed by combination of a segment of gradient (X−Y) and (−Y), thus making it possible to obtain the minimum value of the data accumulation quantity and the minimum point of time when it becomes the minimum.

A concrete example of computing the initialization termination point of time (a point where the accumulation quantity is at the minimum value) in the accumulation quantity variation pattern computing circuit 326 will be described hereinafter. A case in which the reserved time slot in one frame is the same as the data shown in FIG. 12 is assumed.

It is assumed that the rate of writing data in the receiving buffer, i.e., the transmission rate of the time slots is X[b/s], and the rate of reading data out of the receiving buffer, i.e., the transmission rate of continuous data is Y[b/s]. Since the data quantity mounted on the time slots and arriving at the receiving buffer (the quantity written in the buffer) during one frame period and the data quantity read out of the buffer as continuous data during the same period are equal to each other (the quantity written in the buffer and the quantity read out therefrom during one frame period are equal to each other), a relationship is obtained therebetween as follows.

$$X:Y = 10:4$$

This is due to a fact that the data are read during the time for ten time slots as against that the data are written during the time for four time slots. Further, the increase or decrease rate of the data in the receiving buffer is as follows.

In case of write only ... X[b/s]
In case of read only ... −Y[b/s]
In case of simultaneous write and read ... X−Y[b/s]

Here, a method of computing the variation pattern of the accumulation quantity in the receiving buffer during certain one frame period will be described hereunder.

Figure 15:
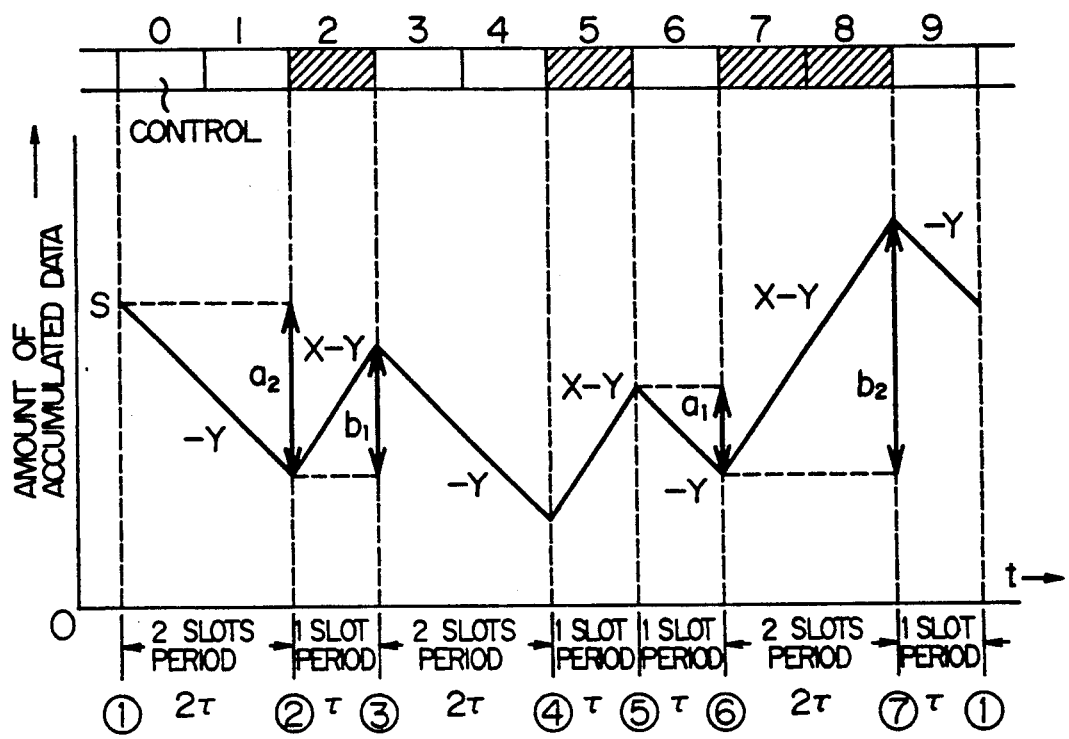
FIG. 15 is a diagram for explaining the operation of the embodiment shown in FIG. 14.

First, when it is assumed that the time required for writing the data in the buffer from one reserved time slot is $\tau$ seconds, $$\tau = a/X$$

is obtained. Here, $a$ represents a data quantity [bits] per one time slot. Further, when the variation pattern of the accumulation quantity is expressed in a graph (the axis of abscissas represents time, and the axis of ordinates represents the accumulation quantity in the receiving buffer) as shown in FIG. 15, gradients of the graph "period of write only", "period of read only" and "period of simultaneous write and read" are $X>0$, $-Y<0$ and $X-Y>0$, respectively. When it is assumed that the accumulation quantity in the receiving buffer when the frame head arrives (when the control time slot arrives) is S as shown in FIG. 15, the accumulation quantities $\beta$ at respective points of time ①, ②, ③, ④, ⑤, ⑥, and ⑦, may be calculated taking X:Y=10:4 into consideration, as follows.

$$
\begin{aligned}
①\ldots\beta_1 &= S \\
②\ldots\beta_2 &= S - 2Y\tau \\
③\ldots\beta_3 = S + X\tau - 3Y\tau &= S - 0.5Y\tau \\
④\ldots\beta_4 = S + X\tau - 5Y\tau &= S - 2.5Y\tau \\
⑤\ldots\beta_5 = S + 2X\tau - 6Y\tau &= S - Y\tau \\
⑥\ldots\beta_6 = S + 2X\tau - 7Y\tau &= S - 2Y\tau \\
⑦\ldots\beta_7 = S + 4X\tau - 9Y\tau &= S + Y\tau \\
\text{Next } ①\ldots\beta_1 = S + 4X\tau - 10Y\tau &= S
\end{aligned}
$$

Through such computation, it is found that $\beta_4$ at the point of time ④, i.e., at the point of time of arrival of the time slot No. 5 shows the minimum value of the accumulation quantity.

Thus, since it is possible to make the time required for initialization the shortest if initialization is terminated at the point of time when the accumulation quantity becomes the minimum for the first time at and after the first read start point of time as described previously, it is sufficient that the time slot numbers are counted from the first read start point of time and the time of point when the time slot No. 5 arrives is adopted as the initialization termination point of time.

Incidentally, the timing for reaching the minimum value is obtained from the variation pattern of the accumulation quantity in a stationary state in above-mentioned computation example as shown in FIG. 15, but there is also a method of obtaining the initialization termination point of time by computing the variation pattern from the initialization start point of time till reaching to the stationary state. Both produce the same results.

Figure 16:
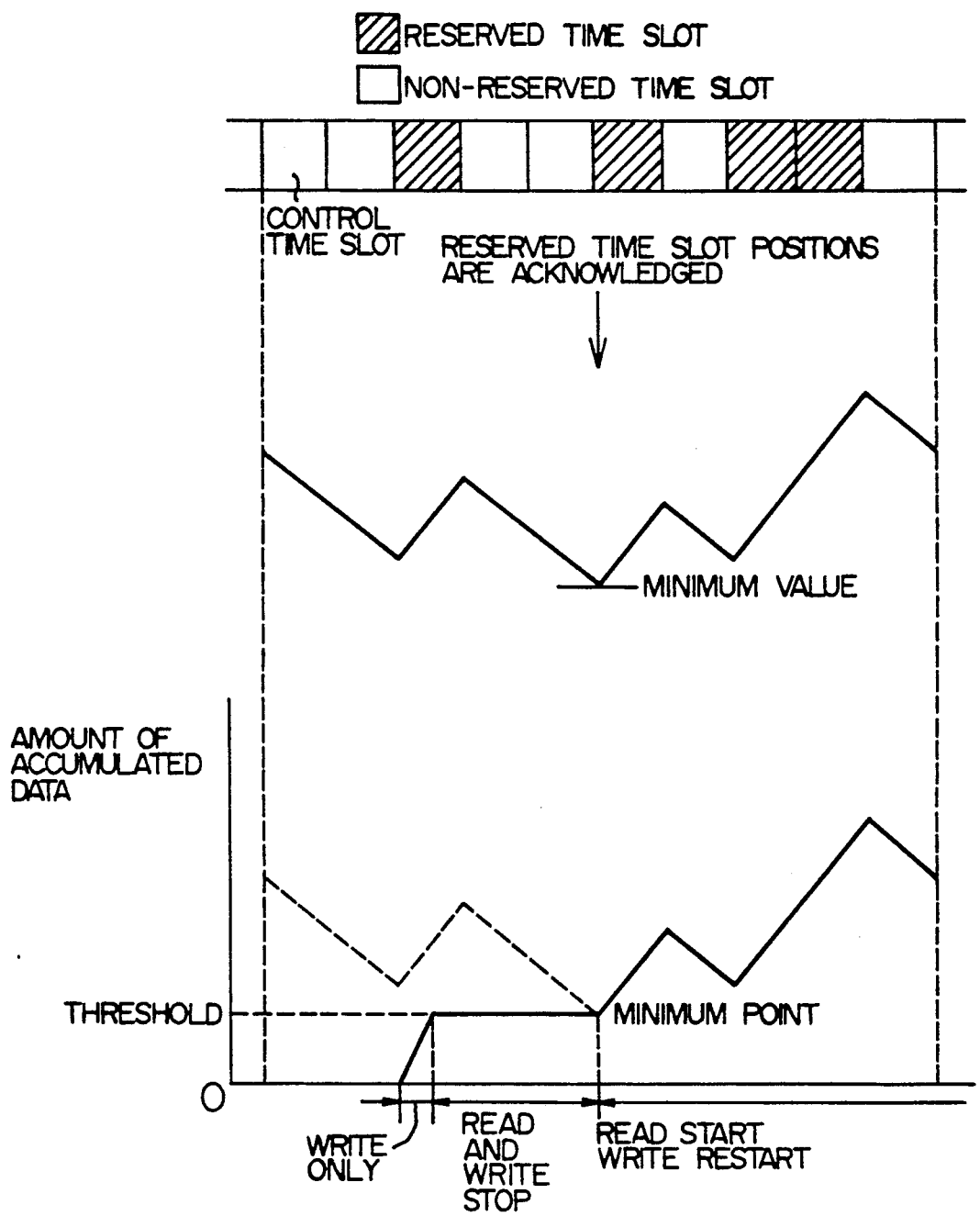
FIG. 16 is a diagram for explaining the operation of the embodiment shown in FIG. 14.

Furthermore, such control that the minimum point of time is informed to the packet-formed data write permit generating circuit 321 and the continuous data read permit generating circuit 320, the continuous data read permit generating circuit 320 does not send the read notice until the point of time when the data accumulation quantity becomes equal to the threshold, only the packet-formed data write permit generating circuit 321 sends the write notice, neither the write notice nor the read notice is sent from the point of time when the data accumulation quantity becomes equal to the threshold to the initialization termination point of time, and the write notice and the read notice are sent in parallel with each other irrespective of the data accumulation quantity of the receiving buffer 2 at and after the initialization termination point of time may be applied. The procedure and the variation of the data accumulation quantity when above-mentioned control method is adopted are shown in FIG. 16.

Figure 17:
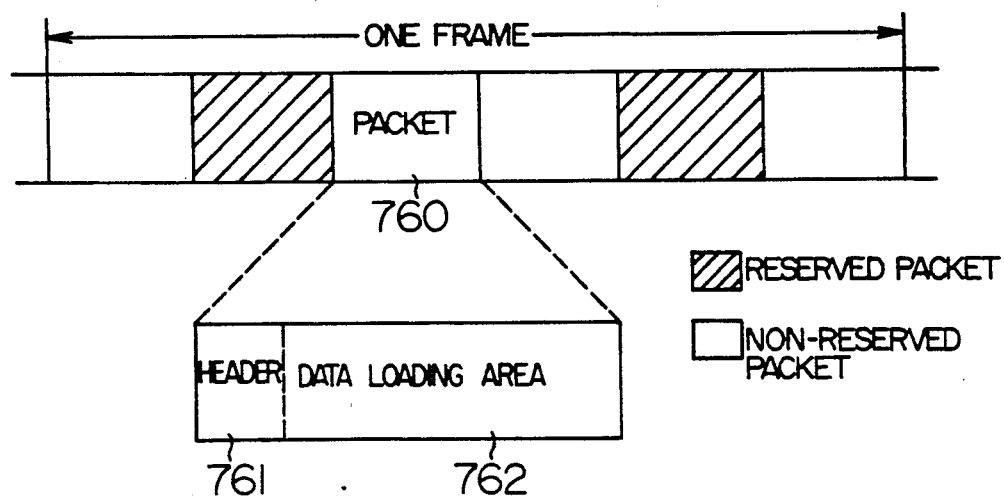
FIG. 17 shows a frame structure of packet data.

Time slots are used in above-mentioned control system, but similar control may be realized when packets forming the frame structure as shown in FIG. 17 are used in place of the time slots.

Figure 18:
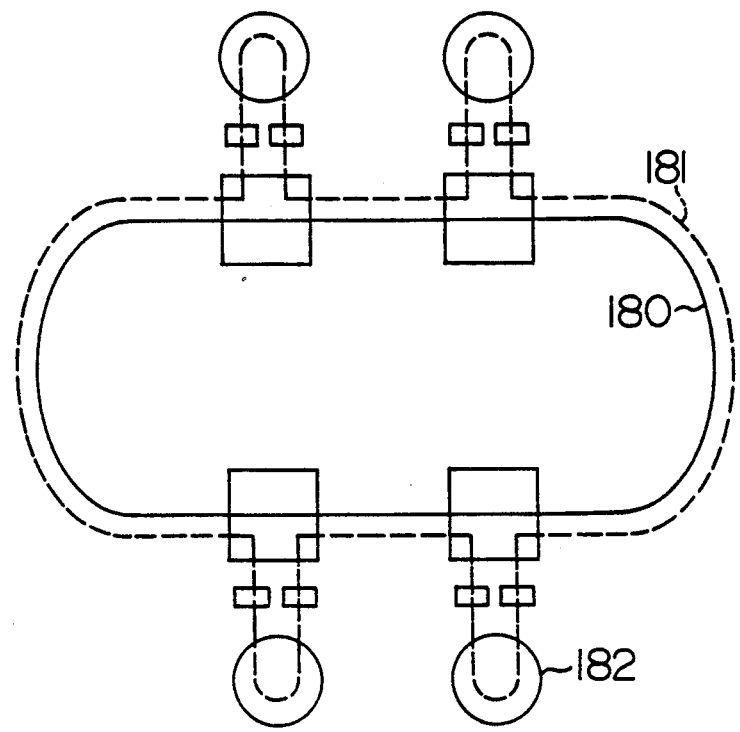
FIG. 18 shows an embodiment of a communication system applicable with the present invention.
Figure 19:
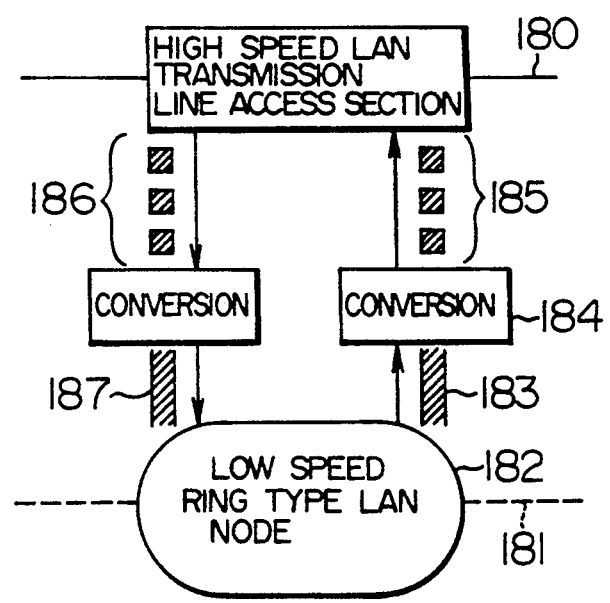
FIG. 19 shows an embodiment of a communication system applicable with the present invention.

FIG. 18 shows an example in which an optional low speed ring type LAN 181 is constructed using a high speed LAN 180 of a slotted ring type (a system of forming a frame using time slots). FIG. 19 is a detailed diagram of the periphery of a node 182 shown in FIG. 18.

First, continuous data 183 (bit serial data similar to those that are transmitted to the transmission line) are transmitted from the node 182 of the low speed ring LAN. These continuous data are converted into packet-formed data 185 in a transmitting section conversion device 184. These data 185 are mounted on the time slots of the high speed LAN 180 and transmitted. Here, the time slots to be mounted with the data are reserved in advance. In the next node, packet data 186 are written from the reserved time slots of the high speed LAN 180, and are converted into continuous data 187 (bit serial data similar to those that are received by an optional node of the ring type LAN from the transmission line) so as to be received by the node 182 of the low speed ring type LAN 181. Similar operation is performed in every node thereafter, thereby to circulate the data. Namely, the high speed LAN and the data conversion section appear as if they were ideal transmission lines for a node of the low speed ring type LAN. This system has such a merit that, when the data transmission speed for handling in the data conversion section (transmission, reception) is adjusted, any type may be used for a ring type LAN connected thereunder.

Figure 20:
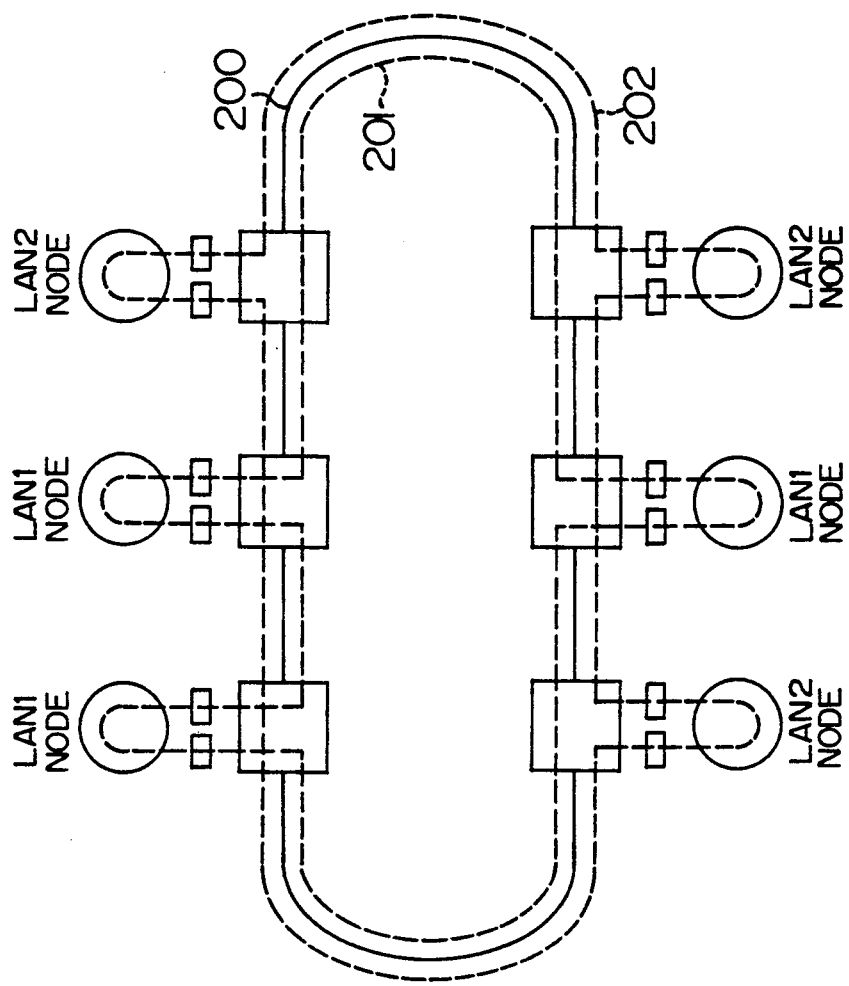
FIG. 20 shows an embodiment of a communication system applicable with the present invention.

Further, FIG. 20 shows a case that transmission lines of a plurality of low speed ring type LANs are consolidated in one line of high speed LAN. The continuous data of two lines of low speed ring type LANs 201 and 202 are converted into packet-formed data and mounted on the time slots, thereby to multiplex them on a high speed LAN transmission line 200. The techniques of the present invention may be applied even to a system in which an ideal transmission line of a plurality of ring type LANs is structured on a transmission line of a high speed LAN.

As described above, according to the present invention, it becomes possible to reduce the data transmission delay time, when packet-formed data are converted into continuous data from reserved time slots, by minimizing the data residence time in the receiving buffer, i.e., by minimizing the data conversion time after taking the compensation portion of the data accumulation quantity against clock variation into consideration.

What is claimed is:

1. A method of controlling writing of data from a communication transmission line of a communication system in a buffer device and reading of the data out of said buffer device, comprising the steps of:

receiving data from said communication transmission line and writing received data in said buffer device at a predetermined write rate;

starting to read the data, written in said buffer device, out of said buffer device at a predetermined read rate;

comparing the quantity of data written and accumulated in said buffer device with a predetermined threshold during a predetermined period from a read start point of time;

writing the data from said communication transmission line by said buffer device when it is found as a result of comparison that the quantity of said accumulated data is the same as or less than said threshold; and performing both write of data from said communication transmission line and read of data out of said buffer device during said predetermined period when the quantity of said accumulated data is larger than said threshold.

2. A method of controlling a buffer device according to claim 1, further comprising a step of:

performing both write of data from said communication transmission line and read of data out of said buffer device at the same time after the lapse of said predetermined period irrespective of said threshold.

3. A method of controlling a buffer device according to claim 1, wherein said threshold is determined in accordance with a variation quantity of a clock signal, which drives said buffer device, for determining said predetermined write rate or said predetermined read rate.

4. A method of controlling a buffer device according to claim 1, wherein said predetermined period is a period corresponding to one frame period of said data.

5. A method of controlling writing of communication data in a buffer device and reading of said communication data out of said buffer device in a communication system in which a plurality of time slots are provided, said communication data being arranged in reserved ones of said time slots, and said communication data including control information and being propagated in a communication transmission line, comprising the steps of:

receiving said communication data from said communication transmission line and writing said communication data in said buffer device at a predetermined write rate;

starting to read said communication data, written in said buffer device, out of said buffer device at a predetermined read rate;

detecting positions of said reserved ones of said tome slots based on said control information of said communication data;

determining a position where the quantity of said communication data accumulated in said buffer device becomes a minimum based on detected positions of said reserved ones of said time slots;

comparing the quantity of said communication data written and accumulated in said buffer device with a predetermined threshold during the period from a read start point of time until reaching the position where the quantity of data becomes the minimum;

writing said communication data from said communication transmission line in said buffer device when it is found as a result of comparison that the quantity of said accumulated communication data is the same as or less then said threshold; and writing said communication data from said communication transmission line and reading said communication data out of said buffer device at the same time when the quantity of said accumulated data is larger than said threshold.

6. A method of controlling writing of communication data in a buffer device and reading of said communication date out of said buffer device in a communication system in which a plurality of time slots are provided, said communication data being arranged in reserved ones of said time slots, and said communication data including control information and being propagated in a communication transmission line, comprising the steps of:

receiving said communication data from said communication transmission line and writing said communication data in said buffer device at a predetermined write rate;

starting to read said communication data, written in said buffer device, out of said buffer device at a predetermined read rate;

detecting positions of said reserved ones of said time slots based on said control information of said communication data;

determining a position where the quantity of said communication data accumulated in said buffer device becomes a minimum based on said detected positions of said reserved ones of said time slots;

not performing read of said communication data out of said buffer device during the period from a read start point of time until reaching the position where the quantity of said communication data becomes the minimum; and performing both write of said communication data from said communication transmission line and read of said communication data out of said buffer device at and after the position where the quantity of said accumulated data becomes the minimum.

7. A buffer device arranged between a communication transmission line and a communication terminal equipment in a communication system for controlling transmission of communication data, comprising:

means for receiving communication data from said communication transmission line;

memory means for storing received communication data;

means form controlling timing of writing received communication data in said memory means at a predetermined write rate;

threshold setting means for designating as a threshold the minimum quantity of communication data accumulated in said memory means; and means for comparing the quantity of communication data written and accumulated in said memory means with said threshold during a predetermined period from the read start point of time, and prohibiting read of said communication data out of said memory means when the quantity of said accumulated data is the same as or less than said threshold, and permitting read of said communication data out of said memory means at a predetermined read rate when the quantity of said communication data accumulated in said memory means is larger than said threshold.

8. A buffer device according to claim 7, wherein communication data in said communication transmission line are communicated in a plurality of time slots and the communication data are arranged in reserved ones of said time slots, and said buffer device further includes means for detecting said reserved ones of said time slots and applying a signal for write permit to said means for controlling every time said reserved ones of said time slots are detected.

9. A buffer device according to claim 7, wherein communication data in said communication transmission are communicated in a plurality of time slots, said communication data being arranged in reserved ones of said time slots, and said communication data further include data control information, said buffer device further comprising:
  means for detecting positions of said reserved ones of said time slots based on said control information of said communication data and determining the position where the quantity of said communication data accumulated in said memory means becomes a minimum based on said detected positions of said reserved ones of said time slots; and
  means for comparing the quantity of said communication data written and accumulated in said memory means with said threshold during the period from the read start point of time until reaching the position wherein said communication data quantity becomes the minimum, and prohibiting read said communication of data out of said memory means when the quantity of said accumulated communication data is the same as or less than threshold and permitting read of said communication data out of said memory means at a predetermined read rate when the quantity of said communication data accumulated in said memory means is larger than said threshold.

10. A communication system having a communication transmission line in which communication data are transmitted and a plurality of communication nodes coupled with said communication transmission line, each of said communication nodes comprising:
  means for receiving data from said communication transmission line;
  communication terminal equipments coupled with said communication nodes;
  a buffer device arranged between said communication receiving means and said communication terminal equipments for controlling transmission of the communication data;
  memory means for storing received communication data;
  memory means for storing received communication data;
  means for controlling timing to write received communication data in said memory means at a predetermined write rate;
  threshold setting means for designating as a threshold the minimum quantity of said communication data accumulated in said memory means; and
  means for comparing the quantity of said communication data written and accumulated in said memory means with said threshold for a predetermined period from a read start point of time, and prohibiting read of said communication data out of said memory means when the quantity of said accumulated communication data is the same as or less than said threshold, and permitting read of said communication data out of said memory means at a predetermined read rate when the quantity of said communication data accumulated in said memory means is larger than said threshold.

* * * * *